(12) United States Patent
Cooley et al.

(10) Patent No.: US 11,265,398 B2
(45) Date of Patent: Mar. 1, 2022

(54) MANAGING CLIENT COMPUTING SYSTEMS USING DISTILLED DATA STREAMS

(71) Applicant: VMware, Inc., Palo Alto, CA (US)

(72) Inventors: James W. Cooley, Seattle, WA (US); Sufian A. Dar, Bothell, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/135,390

(22) Filed: Dec. 28, 2020

(65) Prior Publication Data

US 2021/0120100 A1  Apr. 22, 2021

Related U.S. Application Data

(63) Continuation of application No. 16/256,720, filed on Jan. 24, 2019, now Pat. No. 10,880,405.

(51) Int. Cl.

| | |
|---|---|
| *H04L 29/08* | (2006.01) |
| *H04L 67/00* | (2022.01) |
| *H04L 67/75* | (2022.01) |
| *H04L 67/025* | (2022.01) |
| *H04L 41/084* | (2022.01) |
| *H04L 43/0817* | (2022.01) |
| *H04L 41/0866* | (2022.01) |
| *H04L 67/1008* | (2022.01) |
| *H04L 65/40* | (2022.01) |

(52) U.S. Cl.
CPC ......... *H04L 67/34* (2013.01); *H04L 41/0846* (2013.01); *H04L 41/0866* (2013.01); *H04L 43/0817* (2013.01); *H04L 67/025* (2013.01); *H04L 67/1008* (2013.01); *H04L 67/36* (2013.01); *H04L 29/08* (2013.01)

(58) Field of Classification Search
None
See application file for complete search history.

(56) References Cited

U.S. PATENT DOCUMENTS

| | | | |
|---|---|---|---|
| 10,203,967 B1 * | 2/2019 | Atta | H04L 67/101 |
| 10,574,513 B2 * | 2/2020 | Nagarajan | H04L 43/0805 |
| 2018/0331928 A1 * | 11/2018 | Dave | G06F 9/5072 |
| 2019/0064787 A1 * | 2/2019 | Maturana | G05B 23/0227 |

* cited by examiner

*Primary Examiner* — James A Edwards
(74) *Attorney, Agent, or Firm* — Dentons US LLP

(57) ABSTRACT

The present disclosure relates to techniques for managing client computing systems, such as a client distributed-computing system. In one embodiment, a desired state of the client distributed-computing system and a current state of the client distributed-computing system are received. Measurement data generated by a plurality of components of the client distributed-computing system is received. The measurement data is processed using one or more analytical or statistical techniques to generate distilled data. Based on one or more policies and the desired state, the distilled data and the current state are analyzed to determine one or more actions predicted to converge the current state of the client distributed-computing system towards the desired state. One or more control commands corresponding to the one or more actions are provided to the client distributed-computing system. The one or more control commands cause the client distributed-computing system to perform the one or more actions.

17 Claims, 7 Drawing Sheets

MANAGING CLIENT COMPUTING SYSTEMS USING DISTILLED DATA STREAMS

CROSS-REFERENCE TO RELATED APPLICATIONS

This application is a continuation of U.S. patent application Ser. No. 16/256,720, entitled "MANAGING CLIENT COMPUTING SYSTEMS USING DISTILLED DATA STREAMS," filed Jan. 24, 2019, the content of which is hereby incorporated by reference in its entirety for all purposes.

FIELD

The present disclosure relates generally to managing client computing systems and, more specifically, to managing client distributed-computing systems using a distilled data stream.

BACKGROUND

Cloud computing is a model of service delivery that enables convenient, on-demand network access to a shared pool of configurable computing resources (e.g. networks, network bandwidth, servers, processing, memory, storage, applications, virtual machines, services, etc.). For example, a cloud computing provider can deliver computing services to a client computing environment through the Internet. Such delivery of computing services can require the secure exchange of data messages (e.g., in real time) between a cloud-services computing environment providing the computing services and a client computing environment utilizing the computing services. The data messages can include, for example, ingestion requests associated with ingesting large volumes of customer data at the cloud-services computing environment. The data messages can also include, for example, command requests associated with performing remote management tasks at the client computing environment.

The computing services delivered by the cloud computing provider can include configuration management services, which include managing the configuration and operation of a client computing system in the client computing environment to maintain a desired level of stability, performance, and efficiency. Conventionally, such management can include the execution of scripts and/or procedural workflows that control the operation and configuration of the client computing system. As client computing systems become more complex, improved techniques for delivering configuration management services are desired.

SUMMARY

Described herein are techniques for managing client computing systems, such as a client distributed-computing system. In one embodiment, a desired state of the client distributed-computing system and a current state of the client distributed-computing system are received. The desired state is defined according to user input. The current state is generated by the client distributed-computing system. Measurement data generated by a plurality of components of the client distributed-computing system is received. The measurement data is processed using one or more analytical or statistical techniques to generate distilled data. Based on one or more policies and the desired state, the distilled data and the current state are analyzed to determine one or more actions predicted to converge the current state of the client distributed-computing system towards the desired state. One or more control commands corresponding to the one or more actions are provided to the client distributed-computing system. The one or more control commands cause the client distributed-computing system to perform the one or more actions.

DETAILED DESCRIPTION

Figure 1B:
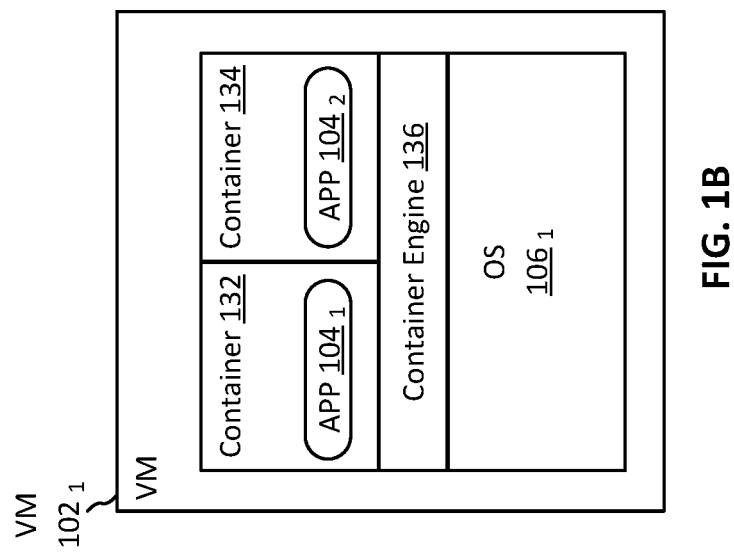
FIG. 1B is a block diagram illustrating a containerized application framework for implementing various components of a distributed-computing system, in accordance with some embodiments.

The following description sets forth exemplary methods, systems, and the like. It should be recognized, however, that such description is not intended as a limitation on the scope of the present disclosure, but is instead provided as a description of exemplary embodiments.

As described above, providing configuration management services to a client computing environment can include managing the configuration and operation of a client computing system in the client computing environment to maintain a desired level of stability, performance, and efficiency. In some examples, the configuration and operation of the client computing system is managed automatically by a control management agent (also referred to herein as a client management agent) of the cloud-services computing environment. In particular, the control management agent can continually monitor the current state of the client computing system and provide various control commands to cause the client computing system to converge towards a desired state of the client computing system. However, in some circumstances, the current state of the client computing system may not adequately indicate the development of emerging events or incidents that substantially affect the state of the client computing system in the immediate future. This may result in the control management agent generating and providing control commands that are less effective for converging the current state of the client computing system to the desired state. To address this issue, the control management agent can monitor additional information from the client computing system (in conjunction with the current state) to manage the configuration and operation of the client computing system. For example, in accordance with the techniques described herein, measurement data from the client computing system is obtained in addition to the current state of the client computing system. The measurement data can include various types of data that is generated by the client computing system and that can be used to infer the operating state of the client computing system. In some embodiments, the measurement data can be distilled, condensed, summarized, and/or enhanced using analytical and/or statistical techniques to generate distilled data. For example, generating the distilled data can include applying analytical and/or statistical techniques to filter the measurement data, reduce the noise in the data, and concentrate information that indicates how the state of the client computing system is currently changing. By using the distilled data in addition to the current signal, the control management agent may better predict suitable actions for the client computing system to perform in order to more effectively converge the current state of the client computing system to the desired state. The control management agent can then provide control commands to cause the client computing system to perform those actions.

In one exemplary process for configuration management described herein, a desired state of the client distributed-computing system and a current state of the client distributed-computing system are received. The desired state is defined according to user input (e.g., input from an administrator). The current state is generated by the client distributed-computing system. Measurement data generated by a plurality of components of the client distributed-computing system is received. The measurement data is processed using one or more analytical or statistical techniques to generate distilled data. Based on one or more policies and the desired state, the distilled data and the current state are analyzed to determine one or more actions predicted to converge the current state of the client distributed-computing system towards the desired state. One or more control commands corresponding to the one or more actions are provided to the client distributed-computing system. The one or more control commands cause the client distributed-computing system to perform the one or more actions.

Figure 1A:
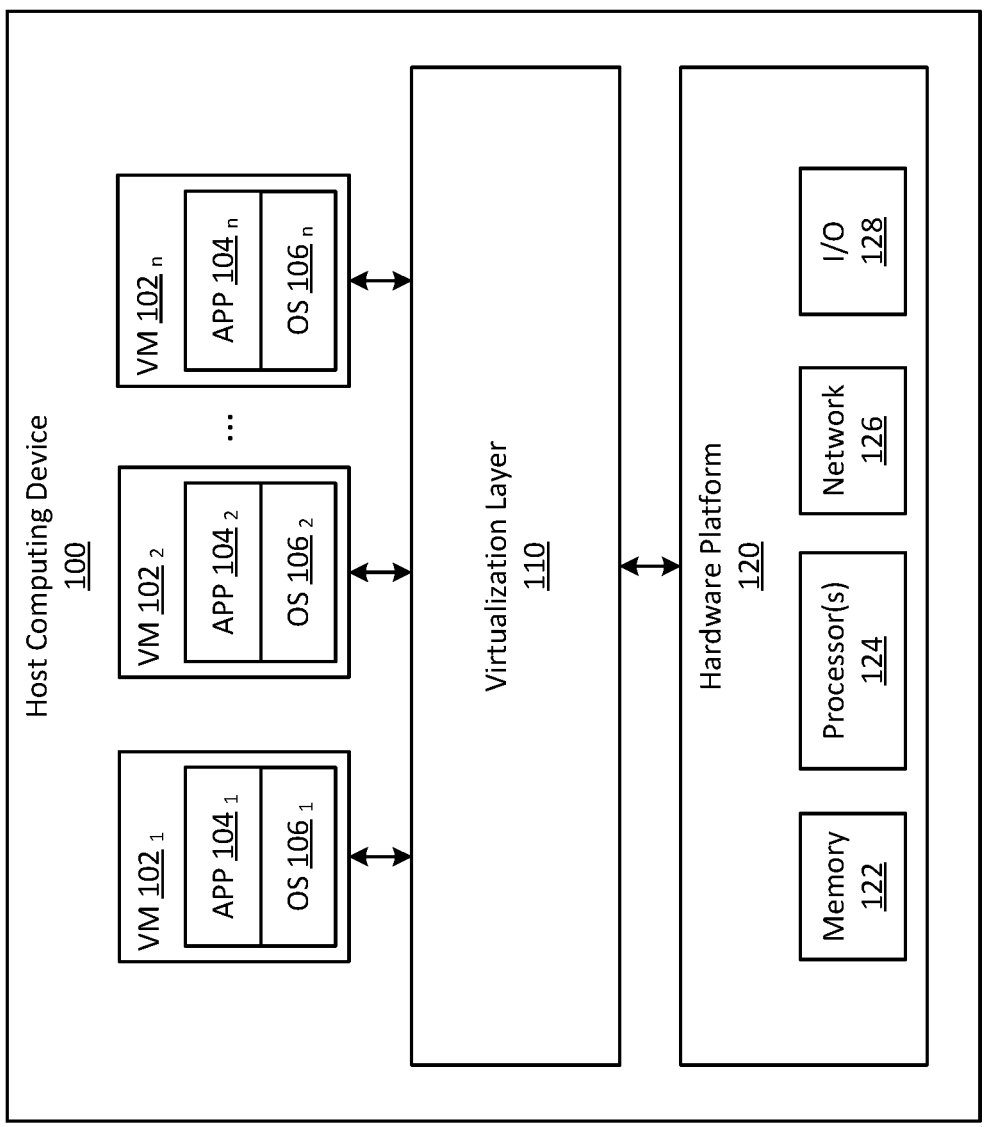
FIG. 1A is a block diagram illustrating a system and environment for implementing various components of a distributed-computing system, in accordance with some embodiments.

FIG. 1A is a block diagram illustrating a system and environment for implementing various components of a distributed-computing system, in accordance with some embodiments. As shown in FIG. 1, virtual machines (VMs) 1021, 1022 . . . 120n are instantiated on host computing device 100. In some embodiments, host computing device 100 implements one or more elements of a distributed-computing system (e.g., a distributed-computing system operating in a client computing environment and/or a cloud-services computing environment described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM 1021 implementing a containerized application framework. Containerization provides an additional level of abstraction for applications by packaging a runtime environment with each individual application. Container 132 includes App 1041 (i.e., application code), as well as all the dependencies, libraries, binaries, and configuration files needed to run App 1041. Container engine 136, similar to virtualization layer 110 discussed above, abstracts App 1041 from OS 1061, while enabling other applications (e.g., App 1042) to share operating system resources (e.g., the operating system kernel). As a result of this abstraction, each App 104 runs the same regardless of the environment (e.g., as though it has its own dedicated operating system). In some embodiments, a container (e.g., container 132 or 134) includes a gateway application or process (e.g., client gateway 332 described below with reference to FIG. 3A or cloud gateway 340 described below with reference to FIG. 3B), as well as all the dependencies, libraries, binaries, and configuration files needed to run the gateway applications.

It should be appreciated that applications (Apps) and/or gateways implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
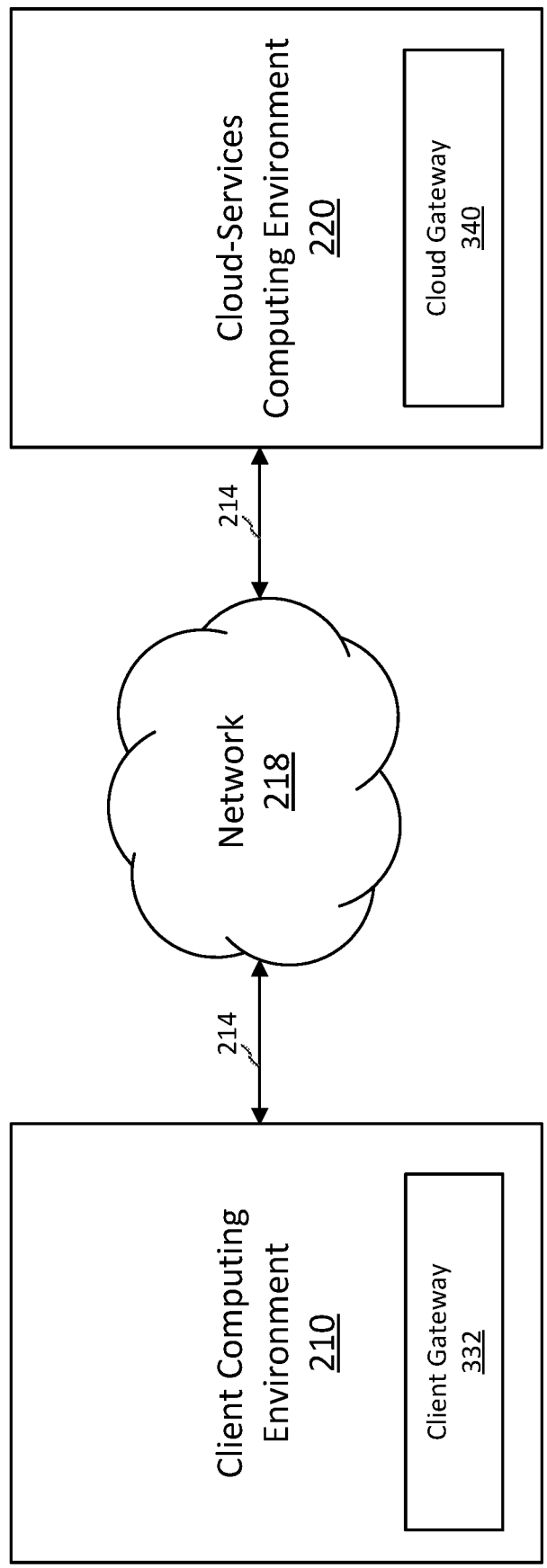
FIG. 2 illustrates a block diagram illustrating systems and environments for secure communications between a client computing environment and a cloud-services computing environment, in accordance with some embodiments.

FIG. 2 is a block diagram illustrating systems and environments for secure communication between client computing environment 210 and cloud-services computing environment 220, in accordance with some embodiments. Client computing environment 210 is an on-premise customer network 202 (e.g., private network) that is formed from resources (e.g., networked systems and devices) owned and/or under the control of an entity (e.g., a corporation or enterprise customer). The entity can provide an authorized group of users (e.g., employees and administrators) access to client computing environment 210 to perform various networked computing tasks. In some embodiments, client computing environment 210 is a distributed-computing environment containing one or more distributed-computing systems.

Cloud-services computing environment 220 is a public or private network that is formed from resources owned and under the control of a different entity (e.g., a corporation providing cloud services, such as VMware™). Cloud-services computing environment 220 is configured to deliver various cloud services to client computing environment 210 via network 218 (e.g., Internet). For example, cloud-services computing environment 220 provides software, platform, or infrastructure services to client computing environment 210. In some examples, client computing environment 210 and cloud-services computing environment 220 are separate networks that do not overlap.

As shown in FIG. 2, client computing environment 210 and cloud-services computing environment 220 include respective gateways (client gateway 332 and cloud gateway 340) configured to facilitate secure communication between the two environments. For example, client gateway 332 and cloud gateway 340 are configured to establish one or more secure communication connections 214 with each other to enable fast, reliable, and secure exchange of data and/or command messages between client computing environment 210 and cloud-services computing environment 220. The one or more communication connections 214 can be used by cloud-services computing environment 220 to provide cloud services to client computing environment 210. For example, as discussed in greater detail below, cloud-services computing environment 220 provides configuration management services to client computing environment 210. In particular, based on data streams containing measurement data for the tenant system(s) of client computing environment 210, cloud-services computing environment 220 provides client computing environment 210 various configuration commands via the one or more communication connections 214 to control and manage the configuration and operation of the tenant system(s).

In some embodiments, the one or more communication connections 214 include one or more bidirectional communication connections that support request-response protocols (e.g., hypertext transfer protocol (HTTP), HTTP/2, TCP/IP, etc.). The bidirectional communication connections are, for example, persistent connections (e.g., HTTP persistent connection or HTTP keep-alive) that do not close after each request-response pair is completed. In some embodiments, the bidirectional communication connections support the transmitting of data streams (e.g., containing data messages) from client computing environment 210 to cloud-services computing environment 220. For example, client gateway 332 sends ingestion request messages from client computing environment 210 to cloud-services computing environment 220 via the one or more bidirectional communication connections. In response, cloud gateway 340 returns corresponding acknowledgement and/or delivery status response messages from cloud-services computing environment 220 to client computing environment 210 via the one or more bidirectional communication connections.

In some embodiments, the one or more communication connections 214 include one or more unidirectional communication connections (e.g., server-sent events (SSE) sessions). The one or more unidirectional communication connections, for example, permit the transmission of data in only one direction. In some embodiments, the one or more unidirectional communication connections support, for example, the transmitting of command messages from cloud-services computing environment 220 to client computing environment 210. For example, cloud gateway 340 sends command request messages from cloud-services computing environment 220 to client computing environment 210 via the one or more unidirectional communication connections. In response, client gateway 332 can return corresponding command response messages from client computing environment 210 to cloud-services computing environment 220 via the one or more bidirectional communication connections (not via the one or more unidirectional communication connections). The command response messages include, for example, data associated with executing the command request messages in client computing environment 210.

In some embodiments, the client computing environment 210 operates behind a firewall. The firewall is implemented, for example, by client gateway 332. For example, client gateway 332 blocks or filters unauthorized communications that are initiated by an external computing environment (e.g., cloud-services computing environment 220) and received via the one or more communication connections 214. Client gateway 332 also denies unauthenticated external requests to establish a communication connection. In some embodiments, client gateway 332 does not have any public Internet Protocol (IP) addresses or ports at which external computer environments can establish communication connections.

In some embodiments, prior to establishing the one or more communication connections 214, client gateway 332 is required to be pre-registered with cloud gateway 340. For example, at start-up, client gateway 332 provides cloud gateway 340 identification information (e.g., IP addresses, credentials such as user names and passwords), the tenant system(s) (also referred to as client systems) it is associated with, the type of agent it is (e.g., a client gateway instead of a service agent), or the like. As described in greater detail below with reference to FIG. 3A, a tenant system can include or access one or more associated data sources. In some embodiments, client gateway 332 is authenticated by cloud gateway 340 using various key authentication techniques, including symmetric or asymmetric authentication cryptography techniques. In some embodiments, secure communication connections are established between client gateway 332 operating in client computing environment 210 and cloud gateway 340 operating in cloud-services computing environment 220 based on client gateway 332's pre-registration and key authentication techniques. In some embodiments, client gateway 332 performs authentication in response to an authentication request from cloud gateway 340 operating in cloud-services computing environment.

In some embodiments, client gateway 332 and cloud gateway 340 are each implemented by one or more containers (e.g., container 132 or 134), VMs (e.g., VM 1021), or host computing devices (e.g., host computing device 100) in the respective computing environments (210 and 220). The functions of client gateway 332 and cloud gateway 340 are described in greater detail below with reference to FIGS. 3A and 3B.

Figure 3A:
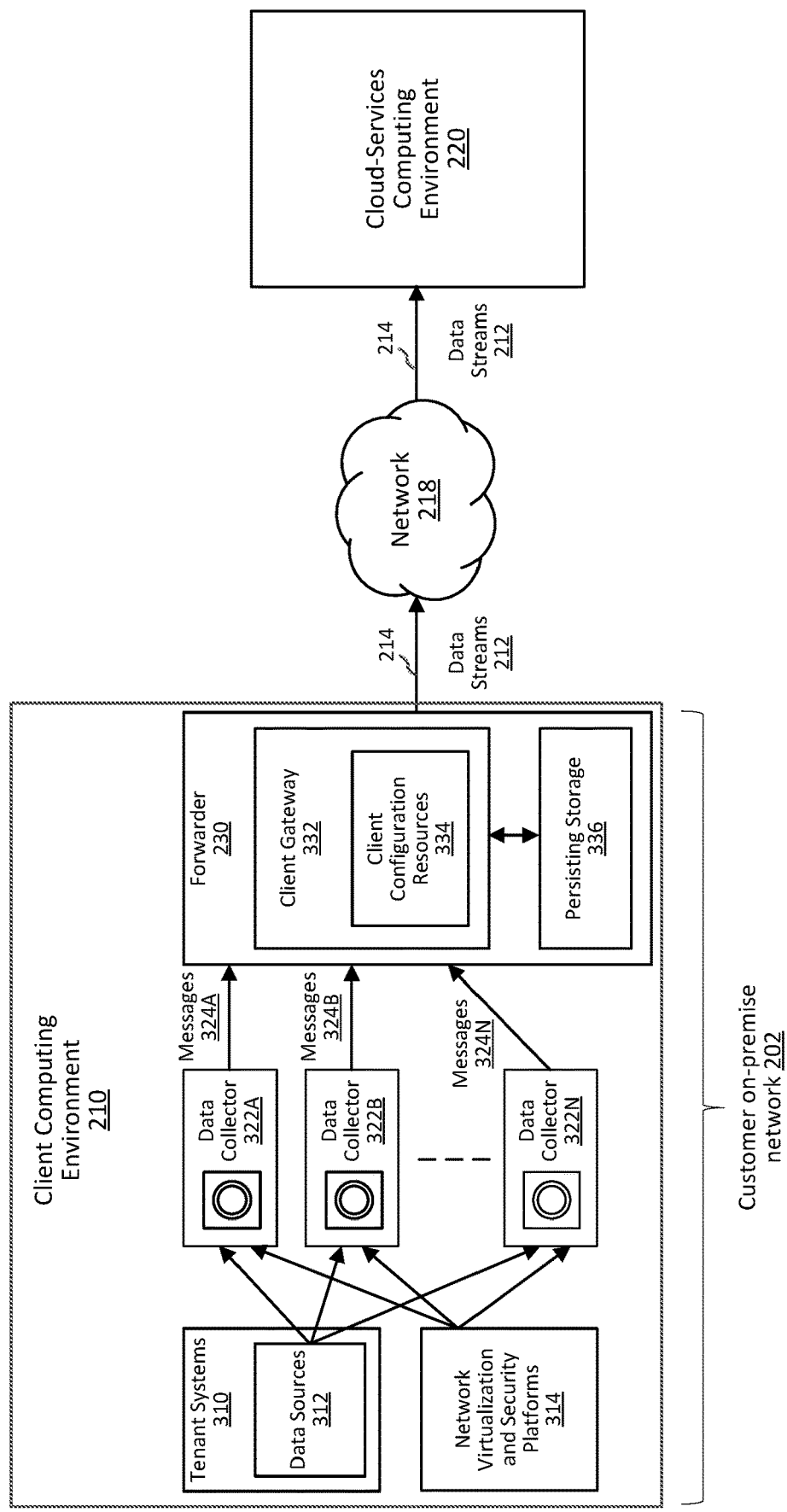
FIG. 3A is a block diagram illustrating systems and environments for securely distributing, to the cloud-services computing environment via data streams, data collected from the client computing environment, in accordance with some embodiments.

FIG. 3A is a block diagram illustrating systems and environments for securely distributing, to cloud-services computing environment 220 via data streams 212, data collected from client computing environment 210, in accordance with some embodiments. As shown in FIG. 3A, in some embodiments, client computing environment 210 includes one or more data sources 312 associated with tenant systems 310, one or more network virtualization and security platforms 314, one or more data collectors 322A-N, a forwarder 230, a client gateway 332, client configuration resources 334, and a persisting storage 336. One or more systems of client computing environment 210 can be hardware, software, or a combination thereof. For example, the systems of client computing environment 210 shown in FIG. 3A can be implemented by one or more containers (e.g., container 132 or 134), VMs (e.g., VM 1021), host computing devices (e.g., host computing device 100), or any combination thereof.

As illustrated in FIG. 3A, tenant systems 310 include or have access to one or more associated data sources 312. A tenant system can be a hardware, a software, or a combination thereof operated by or serving a tenant or client. For example, a tenant system includes one or more servers associated with a same tenant. In some embodiments, a tenant system includes a plurality of electronic devices or components, such as a network of electronic sensors. In some embodiments, a tenant system is provided with the ability to customize at least one aspect of one or more software applications running on the tenant system. For example, a tenant system can be enabled to customize a user interface (e.g., color, appearance, functionality, etc.) of a user terminal for communicating with one or more systems of client computing environment 210 or cloud-services computing environment 220. In some embodiments, one or more data sources 312 includes applications that generate data (e.g., log data), components that generate measurement data, databases that store the generated data, and/or hardware storages. Data sources 312 can be included in tenant systems 310 (e.g., an application running on tenant systems 310) or be an internal/external application/storage that is accessible to tenant system 310. In some embodiments, a tenant system includes a hypervisor configured to abstract processors, memory, storage, and other resources into virtual machines (e.g., VM 1021-n as described with reference to FIG. 1), a management plane configured to control data center services and provide access and control to host computing devices (e.g., host computing device 100), a user interface for managing the client computing environment 210, a virtual machine file system, utility tools, storage, etc.

With reference to FIG. 3A, data sources 312 associated with tenant systems 310 are communicatively coupled to one or more data collectors 322A-N (collectively as data collectors 322). A data collector is a hardware, a software agent, or a combination thereof. Data collectors 322 collect data from the data sources 312, optionally process the collected data, and deliver the data to client gateway 332. The data collected by one or more data collectors 322 includes, for example, a plurality of messages including log messages, application data, measurement data, inventory information, or the like.

In some embodiments, data collectors 322 also collect data from network virtualization and security platforms 314. Network virtualization and security platforms 314 abstracts network operations from underlying hardware onto a distributed virtualization layer, similar to server virtualization of processors and operating systems. For example, network virtualization and security platforms 314 provide logic switching, routing, distributed firewalling, load balancing, virtual private networking, application programming interfaces, dynamic security management, log management, system configuration, and/or other network and security operations. Data generated during these operations may need to be provided for analyzing and optimizing network and security performances, and therefore are provided to one or more data collectors 322, as illustrated in FIG. 3A.

In some embodiments, after one or more data collectors 322 receive data (e.g., messages containing measurement data) from data sources 312 and/or network virtualization and security platforms 314, data collector 322 forwards the data to client gateway 332 with or without further processing of the data. As an example, data collectors 322 forward the received messages to client gateway 332 associated with forwarder 230 without processing. As another example, data collectors 322 include one or more processing pipelines that process the received messages (e.g., extracting payloads, annotating payloads, categorizing payloads, or the like) and then forward the processed messages to client gateway 332 associated with forwarder 230.

As illustrated in FIG. 3A, client gateway 332 receives messages 324A-N (processed or unprocessed) from one or more of data collectors 322A-N, respectively, and assigns the messages to one or more data streams. A data stream can thus include a group or a sequence of messages with a particular order. In some embodiments, the order of the messages in a data stream is determined based on the order the messages are received at client gateway 332. In some embodiments, the order of the messages in a data stream is determined based on predetermined configurations such as priority configurations (e.g., a higher priority may be given to messages collected by a particular data source).

In some embodiments, messages 324A-N include information (e.g., a data file) identifying which data collectors collected, processed, and/or forwarded the messages. For example, a particular message forwarded by data collector 324A includes a data field (e.g., a header) indicating that the particular message is collected, processed, and/or forwarded by data collector 322A. In some embodiments, to assign a particular message to a data stream, client gateway 332 obtains, from the message, the information identifying the collector that collected, processed, and/or forwarded the particular message to client gateway 332. Based on the identification of the data collector associated with the particular message, client gateway 332 identifies a particular data stream associated with the particular data collector. In some embodiments, client gateway 332 performs this identification using predetermined collector-stream associations stored in, for example, client configuration resources 334. For example, a particular data stream is assigned a stream name or ID that is associated with a particular data collector. All messages collected by the particular data collector are assigned to the corresponding data stream. In some embodiments, assigning a particular message to a particular corresponding data stream includes associating a tag to the particular message. The tag, for example, uniquely identifies the particular data stream. As a result, all messages that belong to the same data stream are associated with a same tag.

In some embodiments, a data stream is further associated with and/or identified by the receivers/subscribers of the stream and/or the type of delivery policy to be used for delivering the data stream (e.g., asynchronous or synchronous delivery). The association of data streams with receivers/subscribers and delivery policies is described below in more detail with reference to FIG. 3B.

In some embodiments, the data streams generated by client gateway 332 (e.g., based on assigning messages to data streams) are further processed before they are delivered to one or more receivers operating in client computing environment 210 and/or cloud-services computing environment 220. As illustrated in FIG. 3A, forwarder 230 performs one or more of redacting, filtering, transforming, or obfuscating of the messages in a particular data stream before delivering the data stream to its receivers. For example, forwarder 230 redacts a message by suppressing, blocking, or removing sensitive data such as personal identifiable information included in the message. Forwarder 230 can also filter the plurality of messages in a data stream by suppressing, blocking, or removing messages that are not appropriate or required to be transmitted out of client computing environment 210 (e.g., confidential, sensitive, inappropriate content, etc., that are not appropriate to be transmitted out of the client's private network). Forwarder 230 can also change the format or otherwise transform the messages in a particular data stream to another form (e.g., different file format, content transformation, etc.). Forwarder 230 can also obfuscate messages by masking or obscuring them to enhance security. For example, a sensitive IP address may be replaced with 0.0.0.0 such that the source of the IP address cannot be identified.

In some embodiments, after client gateway 332 assigns messages received from data collectors 322A-N to one or more data streams, and the messages are optionally further processed, client gateway 332 obtains stream routing configurations for routing or delivering the data streams to their destinations. In some embodiments, client gateway 332 is configured such that a particular data stream is delivered not only to remote destinations within cloud-services computing environment 220 for performing cloud-based services (e.g., SaaS services) but also to on-premise destinations within client computing environment 210 for performing on-premise data analysis and services.

Figure 3B:
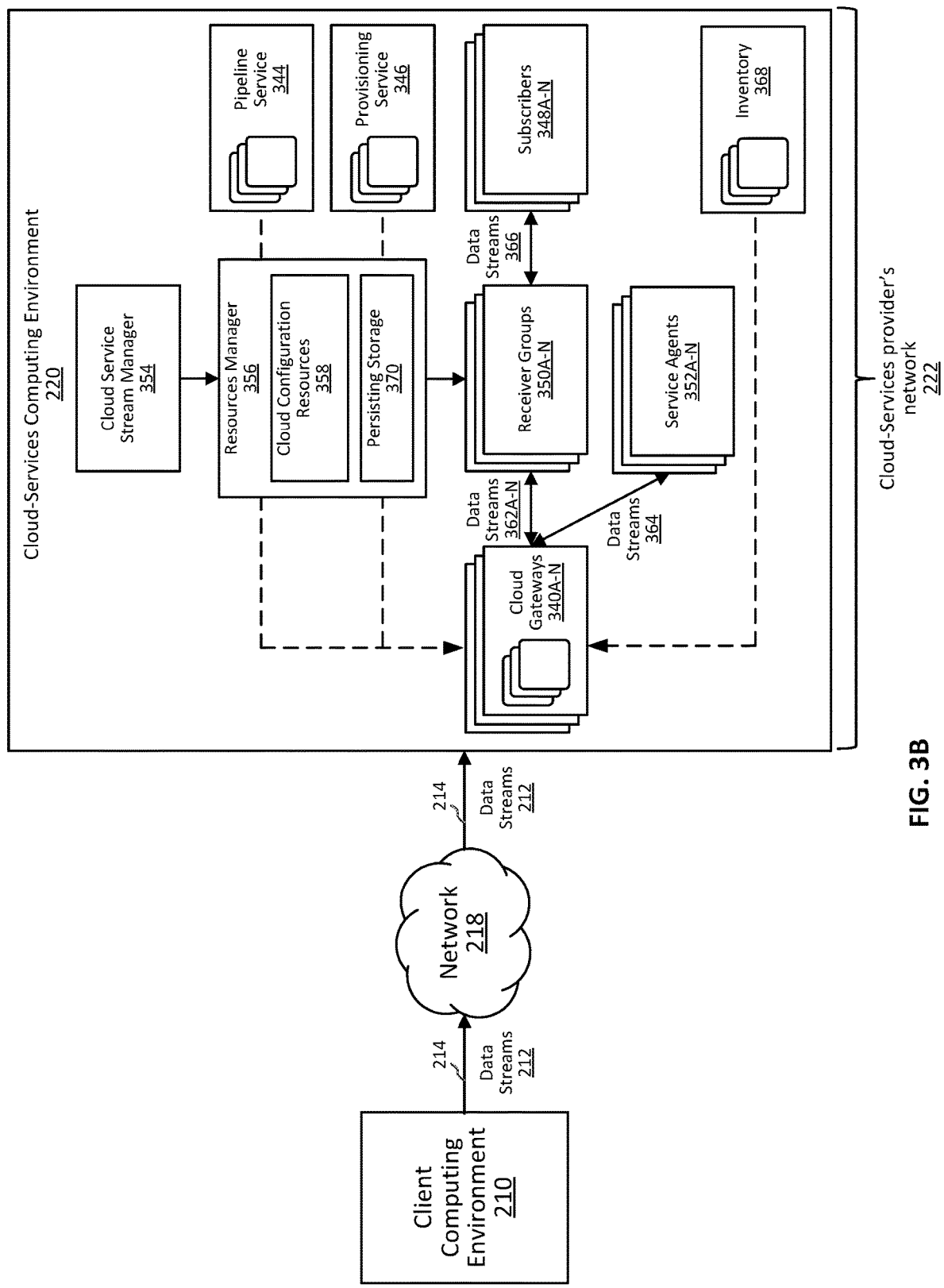
FIG. 3B is a block diagram illustrating systems and environments for distributing data streams to multiple receivers, agents, and services operating in the cloud-services computing environment, in accordance with some embodiments.

FIG. 3B is a block diagram illustrating systems and environment for distributing data streams to multiple receivers, agents, and services operating in cloud-services computing environment 220, in accordance with some embodiments. As described above, a client gateway operating in client computing environment 210 transmits data streams 212 via one or more secure communication connections 214 to cloud-services computing environment 220 using a bidirectional data pipeline via network 218 (e.g., Internet). As illustrated in FIG. 3B, cloud-services computing environment 220 includes one or more cloud gateway 340A-N, a cloud service stream manager 354, a resources manager 356, one or more receiver groups 350A-N (collectively as groups 350), one or more service agents 352A-N (collectively as 352), one or more cloud computing services (e.g., pipeline service 344, provisioning service 346, inventory 368), and one or more data stream subscribers 348A-N (collectively as subscribers 348). One or more systems or components of cloud-services computing environment 220 can be hardware, software, or a combination thereof. For example, the system and/or components of cloud-services computing environment 210 shown in FIG. 3B can be implemented by one or more containers (e.g., container 132 or 134), VMs (e.g., VM 1021), host computing devices (e.g., host computing device 100), or any combination thereof. As described above, cloud-services computing environment 220 includes a cloud-services provider's network 222, which may be a private or public network.

As illustrated in FIG. 3B, cloud gateway 340 receives data streams 212. Cloud gateway 340 can be a data ingress gateway that distributes multiple data streams to multiple destinations. As described above, data streams 212 can include multiple data streams that are associated with respective data collectors. For example, data streams 212 include data streams 362A-N. Messages included in data streams 362A-N are collected by different data collectors operating in client computing environment 210. Different data collectors can collect messages from different data sources or platforms. Thus, data streams 362A-N can include messages collected from different data sources or platforms (e.g., data sources 312). As a result, data streams 362A-N may need to be delivered to different receivers or receiver groups (e.g., receiver groups 350A-N). A receiver is, for example, an uniform resource identifier (URI), a port, or a protocol for message delivery. A receiver group includes one or more receivers for receiving the same data stream. Different receivers in a same receiver group may be configured to store different topics of a particular data stream. Additionally, different receiver groups may be associated with different delivery policies.

In some embodiments, one or more messages in a data stream include path fields indicating the destination of the data stream. The destination is, for example, one or more receivers in a receiver group (e.g., receiver groups 350A-N) or one or more service agents (e.g., service agents 352A-N). In some embodiments, a receiver group or a service agent is an application or service that consumes data from one or more respective data streams. In a specific example, service agents 352A-N include a highlighting agent (e.g., highlighting agent 516, described below) that consumes measurement data generated by one or more components of client computing environment 210. In some embodiments, a path field of a message in a particular data stream includes a stream identification. A particular receiver or multiple receivers in a receiver group can be pre-registered with cloud gateway 340 to be a receiver or receivers for receiving data streams with a particular stream identification. The receiver registration information is represented or included in, for example, a routing table. As a result, the stream identification included in the path field of a message and the receiver registration information can be used by cloud gateway 340 to identify the particular receiver or receivers in a receiver group for receiving the particular data stream. Similarly, using destination information and a routing table, cloud gateway 340 can also identify one or more service agents 352A-N for receiving particular data streams. In some examples, the routing table, which includes the receiver registration information, is stored in cloud configuration resources 358 accessible by cloud gateway 340.

In some embodiments, a receiver group including one or more receivers is associated with a data stream delivery policy. Different receiver groups can have different delivery policies. A cloud gateway can obtain the delivery policy associated with a particular data stream. The delivery policy can be, for example, a wait-for-all policy, a wait-for-any policy, or a wait-for-none policy. In some embodiments, cloud gateway 340A delivers different data streams to different receiver groups based on different delivery policies. This capability of cloud gateway 340A can improve the data delivery efficiency and flexibility because it enables multiple data streams to be multiplexed for delivery while allowing customization of the delivery policies on a per-stream basis. Thus, any single end-to-end data stream delivered from a particular data collector operating in the client computing environment to a particular receiver operating in the cloud-services computing environment can be customized for a particular delivery policy.

In some embodiments, multiple receivers in receiver groups 350A-N are instantiated by cloud service stream manager 354. Cloud service stream manager 354 can be a system or component separate from cloud gateway 340 or integrated with cloud gateway 340. In some embodiments, cloud service stream manager 354 determines the topics and partitions associated with each receiver in receiver groups 350A-N and instantiates the receivers accordingly. Such determination can be based on configurations such as subscribed topics stored in cloud configuration resources 358. As an example, cloud service stream manager 354 can determine the subscribed topics based on known subscribers 348A-N. A subscriber can be an application or cloud computing service provider that consumes data (e.g., messages) for any purposes. For example a subscriber is a cloud-based application that performs analysis on the subscribed data to provide optimization suggestions to the client. A subscriber can also be a software-as-a-service application that performs a task requested by the client. Thus, with the knowledge of subscribers and their subscribed topics, cloud service stream manager 354 can determine the corresponding topics/partitions in receiver groups 350A-N and the number of the receivers required. Cloud service stream manager 354 can thus instantiate the receivers with the appropriate topics and partitions.

With reference to FIG. 3B, in some embodiments, cloud gateway 340 routes or deliver multiple data streams to multiple destinations (e.g., receivers or service agents) in a predetermined order. In some embodiments, the data streams are routed or delivered based on the order they are received at the cloud gateway 340. For instance, if cloud gateway 340 receives data streams 362 before data streams 364, cloud gateway 340 can correspondingly route data streams 362 to receiver groups 350 before routing data streams 364 to service agents 352.

In some embodiments, multiple data streams are routed or delivered in accordance with a predefined order determined based on priorities associated with one or more subscribers. For instance, with reference to FIG. 3B, service agents 352 include one or more applications that consume time-sensitive data and thus may have a higher priority than subscribers 348A-N, which can pull data from receiver group 350A-N as needed. As a result, cloud gateway 340 can deliver data streams 364 before delivering data stream 362, or deliver messages of data streams 364 as a priority over messages of data streams 362 (e.g., delivering messages of data streams 364 they are received while delaying the delivery of messages of data streams 362 because they are less time sensitive).

In some embodiments, multiple data streams are routed or delivered dynamically based on one or more network-related conditions. For example, depending on availability of certain receivers or service agents, or depending on bandwidth availability, the routing or delivering of data streams 362 and 364 can be prioritized dynamically to optimize or improve overall operational efficiency.

In some embodiments, cloud-services computing environment 220 includes one or more services such as pipeline service 344, provisioning service 346, inventory service 368, or the like. Pipeline service 344 is a service that facilitates processing and movement of data (e.g., messages in data streams) between different components of cloud-services computing environment 220 (e.g., between persisting storage 370 and other services, or between services). Provisioning service 346 is a service that facilitates allocation of cloud-based resources and services to one or more systems in one or more client computing environments (e.g., the systems in client computing environment 210). Inventory service 368 collects inventory information such as information about the system state, networks, storage, and virtual machines resources for client computing environment 210 and/or cloud-services computing environment 220.

It should be recognized that data generated by various components and systems in cloud-services computing environment 220 can be distributed via data streams in a similar manner as described above. For example, data generated by subscribers 248 or service agents 352 can be provided to cloud gateways 340, which assigns the data to respective data streams. The data is then distributed by cloud gateway 340 (and client gateway 332) via the respective data streams to the components or systems (e.g., subscribers 348, service agents 352, tenant systems 310) that subscribe to those respective data streams.

In some embodiments, one or more services (e.g., 344, 346, 352, and/or 368) can send commands to cloud gateway 340. For instance, provisioning service 346 can push commands to resources manager 356, which then forward the commands to cloud gateway 340. Cloud gateway 340 can further deliver the commands to systems in client computing environment 210 via a secured connection. Techniques for delivering commands from a cloud-services computing environment to a client computing environment in a fast, reliable, and secure manner are described in greater detail below, with reference to FIG. 4.

Figure 4:
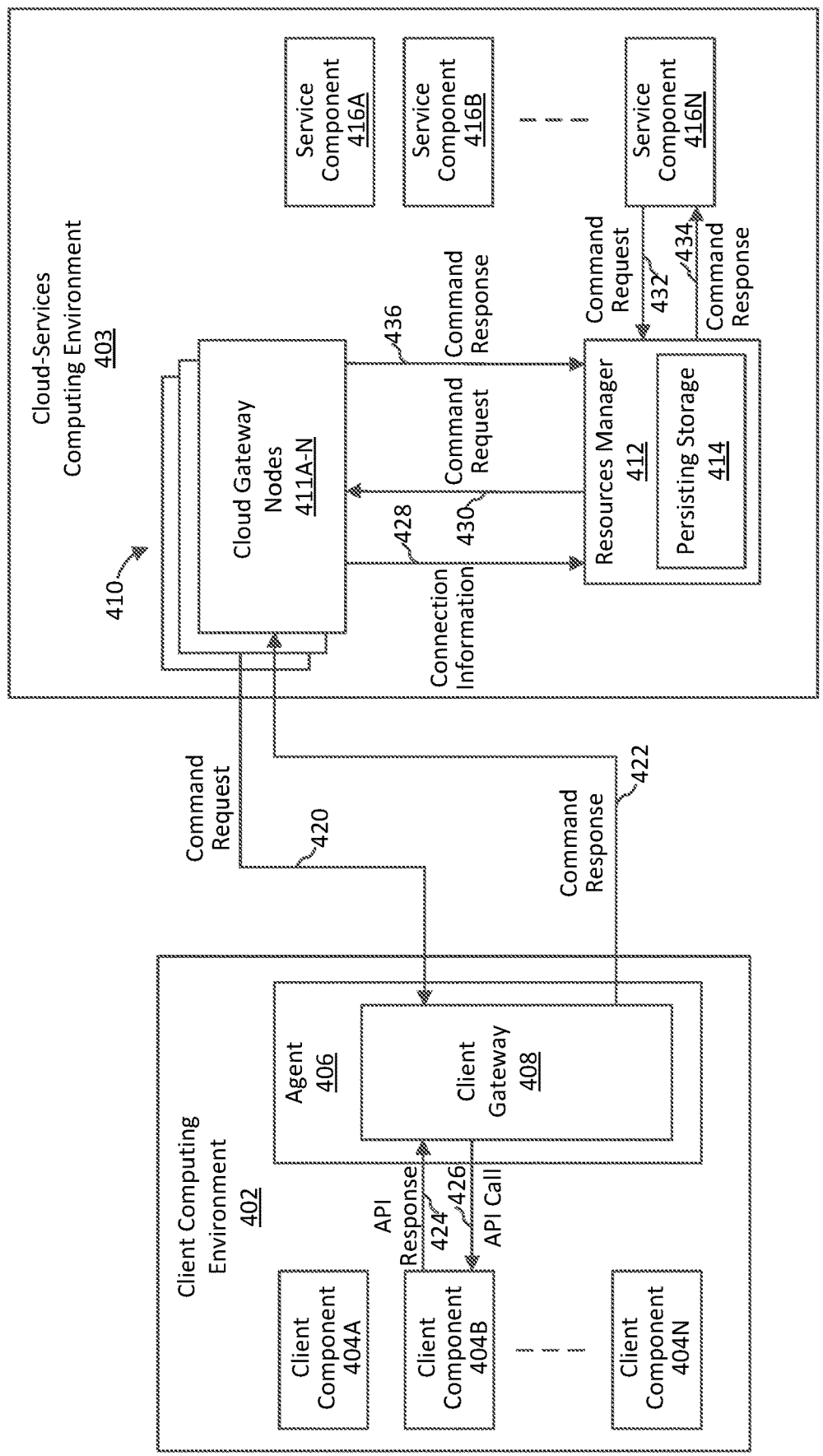
FIG. 4 is a block diagram illustrating systems and environments for securely distributing command streams via a unidirectional communication connection across a client computing environment and a cloud-services computing environment, in accordance with some embodiments.

FIG. 4 is a block diagram illustrating systems and environments that support bidirectional command protocols via unidirectional communication connection 420, in accordance with some embodiments. As shown, client computing environment 402 is in communication with cloud-services computing environment 403 (e.g., via one or more networks, such as network 218). Client computing environment 402 and cloud-services computing environment 403 are similar or the same as client computing environment 210 and cloud-services computing environment 220, respectively (FIGS. 2, 3A, and 3B). Cloud-services computing environment 403 delivers various cloud services over the Internet to client computing environment 402. For example, cloud-services computing environment 403 provides software, platform, or infrastructure services to client computing environment 402. In a specific example, cloud-services computing environment 403 provides configuration management services to client computing environment 402. In the present embodiment, the services are provided by service components 416A-N to client computing environment 402. Service components 416A-N include, for example, one or more receivers (e.g., receiver groups 350A-N), one or more service agents (e.g., service agents 352A-N), one or more provisioning services (e.g., provisioning service 346), one or more pipeline services (e.g., pipeline service 344), or the like. In a specific example, service components 416A-N include a client management agent (e.g., client management agent 524) for providing configuration management services to client computing environment 402. Data is exchanged between service components 416A-N and client computing environment 402 in the course of providing cloud services to client computing environment 402. Cloud gateway 410 (similar or the same as cloud gateway 340) and resources manager 412 (similar or the same as resources manager 356) are configured to manage and route the data between service components 416A-N and client computing environment 402.

Cloud gateway 410 includes a plurality of cloud gateway nodes 411A-N that implement the functions of cloud gateway 410. Generally, a node refers to a computer entity (e.g., a connection point, a redistribution point, or a communication point) that is deployed or staged in a computing network or environment. For example, a node can be a computer entity having an operating system that is realized in a datacenter or network and can take form as a cloud instance, VM, physical machine, operating system container, network element or storage device. As used herein, a cloud gateway node can be a computer entity (e.g., VM 102, container 132, etc.) that implements the functions of cloud gateway 410, described herein.

Client computing environment 402 includes agent 406 and client components 404A-N. Client components 404A-N are, for example, computing components, devices, or applications that are part of one or more tenant systems (e.g., tenant system 310) of client computing environment 402. Agent 406 hosts client gateway 408 (similar to client gateway 408), which is configured to establish secure communication connections (e.g., 420 and 422) with cloud gateway 410. The secure communication connections are established via a wide area network (e.g., network 218), such as the Internet. Client gateway 408 and cloud gateway 410 are configured to route and distribute data (e.g., HTTP messages) from client components 404A-N to other client components or data receivers within client computing environment 402 as well as to service components 416A-N or data receivers in cloud-services computing environment 403 (via the secure communication connections and using cloud gateway 410). Client gateway 408 and cloud gateway 410 are further configured to route and execute commands that are pushed from service components 416A-N and directed to client components 404A-N (via resources manager 412, cloud gateway 410, and the secure communication connections).

In some embodiments, agent 406 is a standalone application (e.g., JAVA application) implemented on a computing system, such as a VM or container. In some embodiments, agent 406 is a forwarder, such as forwarder 230. Client components 404A-N utilize the cloud-services provided by service components 416A-N. In some embodiments, client components 404A-N include data collectors (e.g., data collectors 322A-N), tenant systems (e.g., tenant systems 310), or the like. Client gateway 408 of agent 406 facilitates the exchange of data between client components 404A-N and service components 416A-N. In some embodiments, client gateway 408 is implemented as a software development kit (SDK) running on agent 406.

During start-up, client gateway 408 sends (e.g., via one or more networks, such as network 218) one or more connection requests to cloud gateway 410. The one or more connection requests include, for example, a request to establish a unidirectional communication connection (e.g., server-sent events session) and a request to establish a bidirectional communication connection (e.g., HTTP persistent connection). Cloud gateway 410 receives the one or more connection requests (e.g., at a public IP address of cloud gateway 410) and authenticates the one or more connection requests based on authentication information contained in the one or more connection requests. Upon successful authentication of the one or more connection requests, one or more corresponding communication connections (e.g., communication connections 214) are established between client gateway 408 and cloud gateway 410.

In the present embodiment of FIG. 4, cloud gateway 410 establishes bidirectional communication connection 422 upon successfully authenticating the request to establish a bidirectional communication connection. For example, bidirectional communication connection 422 is the same as or similar to the one or more bidirectional communication connections described above with reference to FIG. 2 or the bidirectional data pipeline described above with reference to FIG. 3B. Bidirectional communication connection 422 allows request-response communication protocols that are initiated by client gateway 412 to be completed. In some embodiments, client gateway 408 does not accept request messages initiated by cloud gateway 410 via the bidirectional communication connection. For example, a client firewall of the client gateway blocks such request messages from cloud gateway 410. In some embodiments, bidirectional communication connection 420 is a HTTP persistent connection (e.g., HTTP keep-alive connection). In some embodiments, bidirectional communication connection 420 is part of a data ingestion pipeline. For example, bidirectional communication connection 420 enables data ingestion requests initiated at client computing environment 402 to be sent from client gateway 408 to cloud gateway 410, which routes associated data messages to a data receiver (e.g., service components 416A-N of cloud-services computing environment).

As shown in FIG. 4, cloud gateway 410 establishes unidirectional communication connection 420 upon successfully authenticating the request to establish a unidirectional communication connection. Unidirectional communication connection 420 is established, for example, at a first cloud gateway node (e.g., 411A) of cloud gateway 410. In some embodiments, unidirectional communication connection only permits data messages to be transmitted in one direction. For example, unidirectional communication connection 420 allows messages to be sent from cloud gateway 410 to the client gateway 408, but does not permit messages to be sent from client gateway 408 to cloud gateway 410. More specifically, unidirectional communication connection 420 enables command request messages initiated from cloud-services computing environment 403 to be pushed to and executed in client computing environment 402, thereby enabling the performance of remote management tasks, for example. In some embodiments, unidirectional communication connection 420 is an established/open SSE session.

Upon establishing unidirectional communication connection 420, connection information associated with the established unidirectional communication connection is provided to resources manager 412 (as represented by arrow 428), where the connection information is stored in persisting storage 414. The connection information maps identification information (e.g., agent ID) of client gateway 408 to routing information (e.g., IP/port address) of the first cloud gateway node at which the unidirectional communication connection 420 is established. The connection information, for example, instructs resources manager 412 to route any command request messages addressed to client gateway 408 via the first gateway node of cloud gateway 410 and unidirectional communication connection 420.

In some embodiments, prior to establishing unidirectional communication connection 420, resources manager 412 stores a plurality of pending command request messages at persisting storage 414. Upon establishing unidirectional communication connection 420 and in accordance with the request to establish the unidirectional communication connection, one or more of the plurality of pending command request messages are pushed via unidirectional communication connection 420 to client gateway 408. Client gateway 408 then processes the one or more pending command request messages. In some embodiments, resources manager 412 includes a predefined priority policy stored in persisting storage 414. Resources manager 412 applies the priority policy to determine which of the plurality of pending command request messages should be sent to client gateway 408 and in what order.

In some embodiments, after unidirectional communication connection 420 is established, a user initiates a command from the cloud-services computing environment 403 to cause one or more components (e.g., client components 404A-N) of the client computing environment to perform one or more tasks (e.g., remote management tasks). For example, a user connects to service component 416N (e.g., via a client terminal) and causes service component 416N to generate a command request message. In the present embodiment, the command request message is a request to cause client component 404B to perform one or more tasks. For example, the command request message is a request to cause client component 404B to execute a query, to update one or more operating parameters, change an operating state of the client component, provide a status update, or the like. The command request message includes routing information indicating a location (e.g., URL or IP address) or identification (e.g., component ID) of client component 404B. In the present embodiment, the command request message includes a request for client gateway 332 to provide client component 404B with instructions (e.g., application programming interface (API) call) to perform one or more tasks (e.g., configuration management tasks). In other embodiments, the command request message includes a request for client component 404B to perform one or more tasks. In some embodiments, the command request message is generated after the unidirectional communication connection is established at block 504.

As shown in FIG. 4, service component 416N establishes a communication connection with an open port of resources manager 412 and sends (as represented by arrow 432) the command request message to resources manager 412 via the communication connection. In some embodiments, the port remains open after sending the command request message. For example, service component 416N instructs resources manager 412 to leave the port open until a response to the command request message is returned. Upon receiving the command request message, resources manager 412 embeds a token in the command request message. The token includes routing information that enables cloud gateway 410 to route a command response message back to service component 416N. For example, the token includes the IP address and port number of the open port at which resources manager 412 received the command request message from service component 416N.

Resources manager 412 determines where to route the command request message. For example, resources manager 412 determines, based on routing information (e.g., URL or IP address) in the command request message, that the command request message is addressed to client gateway 408. Based on this determination, resources manager 412 obtains identification information (e.g., agent ID) associated with client gateway 408 and determines which cloud gateway node to send the command request message. For example, resources manager 412 accesses the connection information stored in persisting storage 414 to map the agent ID associated with client gateway 408 to the corresponding IP/port address of the first cloud gateway node at which unidirectional communication connection 420 is established. In some embodiments, resources manager 412 then obtains, from the first cloud gateway node, information regarding the state of unidirectional communication connection 420. In accordance with determining, based on the obtain information, that the state of the unidirectional communication connection is open, resources manager 412 sends (as represented by arrow 430) the command request message (e.g., in real time) with the embedded token to the first cloud gateway node. For example, resources manager 412 sends the command request message to the determined IP/port address of the first cloud gateway node.

Conversely, in accordance with determining that the state of the unidirectional communication connection is not open, resources manager 412 stores the command request message in persisting storage 414 and forgoes sending the command request message to the first cloud gateway node. In some embodiments, the command request message is placed in a queue with other pending command request messages awaiting for unidirectional communication connection 420 to open. For example, resources manager 412 periodically obtains from the first cloud gateway node updated information regarding the state of unidirectional communication connection 420. Upon detecting, at a later time, that the state of the unidirectional communication connection changes from not open to open, resources manager 412 sends the stored command request message to the first cloud gateway node. In some embodiments, the stored command request message is sent with other pending command request messages in accordance with a predefined priority policy.

Upon receiving the command request message, the first cloud gateway node forwards the command request message to client gateway 408 via unidirectional communication connection 420. Client gateway 408 executes the command request message and causes client component 404B to perform one or more corresponding tasks. For example, the command request message includes an HTTP request to invoke an API call (as represented by arrow 426) to client component 404B. The API call is, for example, a service request for client component 404B to query, add, update, replicate, or delete data/metadata, perform administrative tasks (e.g., run utilities), change/provide an operating state, update one or more operating parameters, or the like. In a specific example, the API call is a configuration management request to modify one or more configuration parameters of client component 404B. Client gateway 408 executes the HTTP request to invoke the API call to client component 404B. Upon completing the API call, client component 404B returns an API response (as represented by arrow 424) to client gateway 408. The API response confirms, for example, that the API call is successfully processed by client component 404B. In some embodiments, the API response includes data associated with processing the API call. For example, the API response includes data obtained by client component 404B as a result of completing one or more tasks represented by the API call.

Upon receiving the API response, client gateway 408 generates a command response message that includes the data in the API response. The command response message includes the token embedded in the command request message. For example, client gateway 408 embeds the token in the command response message in accordance with instructions in the command request message. Client gateway 408 then sends the command response message to cloud gateway 410 via bidirectional communication connection 422 (not via unidirectional communication connection 420).

Cloud gateway 410 receives the command response message from client gateway 408. In some embodiments, the command response message is received at a second cloud gateway node (e.g., 411B) different from the first cloud gateway node. In some embodiments, the command response message is in the form of an ingestion request message (e.g., HTTP request) that is initiated by client gateway 408 and that serves as a response to the command request message received by client gateway 408 via bidirectional communication connection 422. In some embodiments, in response to receiving the command response message, cloud gateway 410 returns, via bidirectional communication connection 422, a response message to client gateway 406 acknowledging receipt of the command response message. The response message completes the request-response protocol on bidirectional communication connection 422.

Upon receiving the command response message, cloud gateway 410 obtains routing information from the token embedded in the command response message to determine where the received command response message should be routed to. For example, the obtained routing information (e.g., IP address and port number) includes the IP address and port number of resources manager 412 at which the command request message was received from service component 416. Cloud gateway 410 sends (as represented by arrow 436) the command response message in accordance with the obtained routing information. It should be appreciated that because command response message is received via bidirectional communication connection 422 that is different from unidirectional communication connection 420 that command request message was sent (and at a different cloud gateway node), cloud gateway 410 may not know where to route the command response message without the embedded token in the command response message. Thus, embedding the token in the command request message and the command response message can enable the command response message to be returned to the services component that initiated the command request message.

Resources manager 412 forwards (as represented by arrow 434) the command response message received from cloud gateway 410 to service component 416N. The command response message is sent, for example, via the same communication connection (e.g., same port) at which the command request message was received from service component 416N. In some embodiments, the command response message serves as an HTTP response to the command request message received from service component 416N and completes the request-response protocol. Service component 416N, for example, causes the communication connection (and the associated port of resources manager 412) to close upon receiving the command response message.

Figure 5:
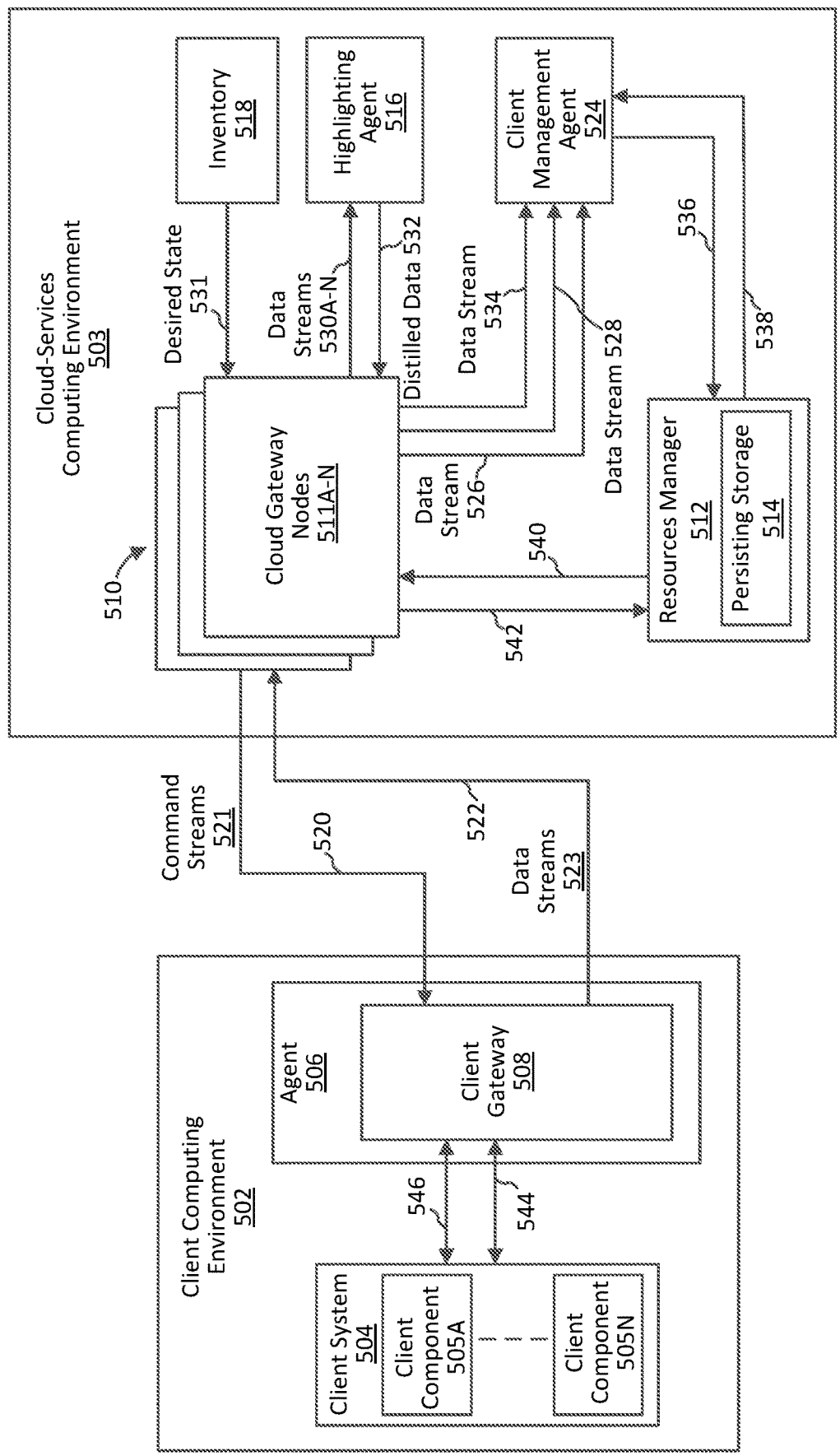
FIG. 5 is a block diagram illustrating systems and environments for managing a client computing environment using a cloud-services computing environment, in accordance with some embodiments.

FIG. 5 is a block diagram illustrating systems and environments for managing client system 504 of client computing environment 502 using cloud-services computing environment 503, in accordance with some embodiments. As shown, client computing environment 502 is communicatively coupled to cloud-services computing environment 503 via one or more secure communication connections, including one or more unidirectional communication connections 520 (similar or the same as connections 420) and one or more bidirectional communication connections 522 (similar or the same as connections 422). Client computing environment 502 and cloud-services computing environment 503 are similar or the same as client computing environment 210 or 402 and cloud-services computing environment 220 or 403, respectively (FIGS. 2, 3A, 3B and 4). For simplicity, some of the components shown in client computing environment 210 or 402 and cloud-services computing environment 220 or 403 are omitted from client computing environment 502 and cloud-services computing environment 503.

Cloud-services computing environment 503 is configured to provide configuration management services to client computing environment 502. In particular, cloud-services computing environment 503 includes client management agent 524, which operates in conjunction with highlighting agent 516 to adjust the configuration of client components 505A-N and cause the current state of client system 504 to converge towards a desired state. Such configuration management can be desirable for the stable and efficient operation of client system 504. In particular, entropy can cause the quality of data generated by client system 504 to deteriorate over time without system management controls processes. The configuration management techniques described below can serve to improve the accuracy and consistency of data generated by client system 504.

Client system 504 is, for example, a tenant system (e.g., tenant system 310) having a plurality of client components 505A-N (similar or the same as client components 404A-N). The plurality of client components 505A-N include, for example, one or more sensor devices, one or more computing devices (e.g., Internet of Things devices), one or more containers (e.g., container 132 or 134), one or more VMs (e.g., VM 1021), one or more host computing devices (e.g., host computing device 100), or any combination thereof. In some embodiments, client system 504 includes a data center. In some embodiments, client system 504 is a distributed-computing system.

Cloud-services computing environment 503 receives (as represented by arrow 531) a desired state of client system 504. The desired state is, for example, a representation of a set of desired operating conditions for client system 504. In some examples, the set of desired operating conditions includes one or more conditions related to system throughput, load balancing, how and where nodes/instances are launched, how and where certain processes are run, the number of certain resources (e.g., servers, VMs, etc.) that are online, or the like.

In some embodiments, the desired state is defined according to user input (e.g., input from an administrator). For example, a user can provide input defining the set of desired operating and/or performance conditions for client system 504. The user input is provided, for example, via a user terminal that is communicatively coupled to one or more systems or components of cloud-services computing environment 503 (e.g., a user interface agent of cloud-services computing environment 503). In accordance with the user-defined set of desired operating conditions, the desired state of client system 504 is generated. In some embodiments, upon generating the desired state, the desired state is persisted in cloud-services computing environment 503. For example, inventory 518 stores the desired state. During operation, the desired state is provided to client management agent 524. In some examples, the desired state is distributed (e.g., from inventory 518) by cloud gateway 510 to client management agent 524 via a respective data stream 526. In these examples, client management agent 524 is a subscriber (e.g., similar to subscribers 348) of data stream 526. Client management agent 524 uses the received desired state as a reference state to manage and control the configuration of client system 504.

Client management agent 524 also receives a current state of client system 504. The current state is generated by client system 504. The current state is a representation of the current operating and/or performance conditions of client system 504 (e.g., the operating conditions within a reference time period t). The current state represents, for example, the combined composite state of client components 505A-N. In some examples, the operating metrics represented by the current state are similar or the same as those represented by the desired state. In some embodiments, the desired state and the current state are each vector representations in a state space. For example, the desired state and current state each correspond to a respective input of a reinforcement learning system. During operation, the current state is distributed from client computing environment 502 to cloud-services computing environment 503 in a data stream (e.g., data streams 523) via one or more bidirectional communication connections 522. For example, the current state is distributed in a data stream according to the techniques described above with reference to FIGS. 3A-3B. In particular, cloud gateway 510 receives the current state from client system 504 via client gateway 508 and one or more bidirectional communication connections 522. Cloud gateway 510 then distributes the current state to client management agent 524 via a respective data stream 528.

In some embodiments, prior to receiving the current state of client system 504, client management agent 524 provides one or more previous control commands to client system 504 (e.g., via one or more unidirectional communication connections 520). The one or more control commands cause client system 504 to perform one or more previous actions that alter the previous operating state of client system 504. In particular, performing the one or more previous actions causes client system 504 to change from the previous operating state to the current operating state. In some embodiments, client system 504 generates the current state after it performs the one or more previous actions responsive to receiving the one or more previous control commands.

Client system 504 further generates measurement data. In particular, the measurement data includes various types of data generated by different components (e.g., client components 505A-N) of client system 504. For example, the measurement data includes information that can be used to infer the operating state of client system 504. In some embodiments, the measurement data includes one or more of sensor data (e.g., generated by various sensors, such as temperature sensors, power sensors, humidity sensors, etc.), log data (e.g., application logs, network traces, status logs, error logs, event logs, system state dumps, etc.), transactional data, network data, resource capacity data, performance metric data, configuration settings data, diagnostic information, system monitoring data, user interaction data, etc. In some embodiments, the measurement data is continuously pushed from client system 504 to cloud-services computing environment 503 (e.g., using the techniques described above with reference to FIGS. 3A-3B) via the one or more bidirectional communication connections 522. For example, client system 504 pushes (e.g., as represented by arrows 546) the measurement data to client gateway 508, which assigns the measurement data to respective data streams (e.g., data streams 523). In some embodiments, measurement data generated by a particular client component is assigned to a separate data stream. Thus, in some embodiments, each data stream corresponds to a respective client component of client component 505A-N. Client gateway 508 provides the measurement data in the respective data streams to cloud gateway 510 via one or more bidirectional communication connections 522. Cloud gateway 510 then distributes the measurement data via the respective data streams to multiple subscribers in cloud-services computing environment 503.

Highlighting agent 516 receives the measurement data from client system 504 via multiple data streams 530 distributed by cloud gateway 510. In some examples, by virtue of the measurement data being received via data streams 530, the measurement data includes time series data, such as data messages that are timestamped at the time of generation. It should be recognized that, in some embodiments, various portions of the measurement data are also distributed to other systems and components of cloud-services computing environment 503 that subscribe to one or more of data streams 530. For example, the measurement data includes log data that is distributed in data stream 530A to highlighting agent 516 as well as a log analytical agent that provides log analytical services for client computing environment 502. In some examples, the measurement data includes network data that is distributed in data stream 530B to highlighting agent 516 as well as a network analytical agent that provides application security planning and network troubleshooting services for client computing environment 502. Highlighting agent 516 subscribes to multiple streams of measurement data (data streams 530), which provide a comprehensive representation of the operating state of client system 504.

In some embodiments, highlighting agent 516 receives the measurements data after client management agent 524 provides the one or more previous control commands to client system 504 (e.g., via one or more unidirectional communication connections 520), which cause client system 504 to perform the one or more previous actions. The measurement data includes, for example, data received by highlighting agent 516 in data streams 530A-N within a predefined time period after client management agent 524 provides the one or more previous control commands to client system 504. In some embodiments, a portion of the received measurement data is generated by one or more client components 505A-N after client system 504 generates the current state. This portion can be advantageous in providing insight into how the operating state of client system 504 is evolving after the current state is generated.

Highlighting agent 516 processes the received measurement data using one or more analytical or statistical techniques to generate distilled data. In some embodiments, processing the measurement data using the one or more analytical or statistical techniques includes filtering the measurement data to identify a subset of the measurement data. For example, various analytical and statistical techniques can be used to extract out, from the measurement data, the subset that is most relevant to the operating conditions represented by the desired state and/or current state. In these embodiments, the processing by highlighting agent 516 can serve to filter out the noise in the measurement data and concentrate the signal such that the extracted subset more clearly indicates the current operating conditions of client system 504 and how the operating conditions will evolve. The distilled data thus includes the identified subset of the measurement data. Additionally, in some embodiments, the distilled data excludes a majority (e.g., greater than 50%, 75%, or 95%) of the measurement data.

In some embodiments, the one or more analytical or statistical techniques used to generate the distilled data include machine learning techniques. For example, supervised or unsupervised machine learning techniques (e.g., neural network models, reinforcement learning, clustering, etc.) are used to assign a priority value (e.g., likelihood value) or a classification for each data item (e.g., data message) in the measurement data. A subset of the measurement data is then selected using the assigned priority value or classification. For example, data items having the N highest priority values (where N is a predefined positive integer) or having priority values that satisfy a predefined condition (e.g., greater than a threshold value) are selected as part of the subset. In another example, data items having a particular classification are selected as part of the subset. Accordingly, in some examples, the machine learning techniques are configured to identify (e.g., by means of the assigned priority value or classification) data items that are most relevant to the current and/or future operating state of client system 504.

In some embodiments, the one or more analytical or statistical techniques are based on past observations of client system 504. The past observations are made, for example, in a past time period prior to client management agent 524 receiving the current state of the client system 504 and prior to highlighting agent 516 receiving the measurement data. In some embodiments, the past observations correspond to respective past actions performed by client system 504 in response to previous commands provided by client management agent. For example, in the past time period, highlighting agent 516 generated previous distilled data from previous measurement data received from client system 504. Based on the previous distilled data, client management agent 524 predicted previous actions for client system 504 and provided previous commands to cause client system 504 to perform the previous actions. In these examples, the past observations include observations of whether or not the state of client system 504 converged towards the desired state (and by how much) upon performing the previous actions. Based on these past observations and the previous distilled data generated by highlighting agent 516, the machine learning techniques can learn to identify data items in the current measurement data that are most likely to cause client management agent 524 to predict current actions that cause the current state of client system 504 to converge towards the desired state. For example, the machine learning techniques can learn to identify the data items that are the precursors to future events or incidents that would change the current state of client system 504 is a meaningful way. Thus, in accordance with some embodiments, the distilled data can be used to predict an emerging event or incident of client system 504 that is not indicated in the current state.

In some embodiments, processing the plurality of streams of measurement data using the one or more analytical or statistical techniques includes generating statistical data from the measurement data. For example, values for various statistical parameters (e.g., minimum, maximum, range, mean, medium, variance, standard deviation, etc.) are generated from the measurement data. To illustrate, the measurement data can include a distribution of values representing the memory capacity of multiple client components 505A-N over a particular time period. In this example, statistical data such as the range, mean, and variance for the distribution of memory capacity can be generated. In these embodiments, the generated statistical data is included as part of the distilled data.

In some embodiments, processing the plurality of streams of measurement data using the one or more analytical or statistical techniques includes applying one or more functions to at least a portion of the measurement data to generate at least a portion of the distilled data. For example, the one or more functions include any mathematical function or operation (e.g., differentiation, integration, summation, etc.). The one or more functions are applied to any number of variables represented in the measurement data. For example, a derivative function can be applied to generate values represented the change of a one variable (e.g., memory capacity) with respective to another variable (e.g., time). The data derived from applying the one or more functions can serve to combine and/or condense at least a portion of the measurement data and can provide a stronger signal for indicating the current and future operating state of client system 504.

As shown in FIG. 5, highlighting agent 516 provides (e.g., as represented by arrow 530) the generated distilled data to cloud gateway 510, which assigns the distilled data to data stream 534. Cloud gateway 510 distributes the distilled data via data stream 534 to client management agent 524, which is a subscriber of data stream 534. It should be recognized that, in some embodiments, one or more other components of cloud-service computing environment 503 subscribe to data stream 534 and thus also receive the distilled data. For instance, other service agents can receive the distilled data (via data stream 534) and use the distilled data to provide other analytical services for client computing environment 502. By way of example, a network service agent of cloud-service computing environment 503 subscribes to data stream 534 and uses the received distilled data to generate more accurate and useful network analysis for client system 504, which can be used to perform network troubleshooting and improvements for client system 504.

Based on one or more predefined policies and the received desired state, client management agent 524 analyzes the received distilled data in conjunction with the received current state and determines one or more actions that are predicted to converge the current state of client system 504 towards the desired state. For example, client management agent 524 maps the current state of client system 504 to the possible sets of one or more actions that client system 504 can take given the current state. In some embodiments, the possible sets of one or more actions are predefined (e.g., defined at least prior to client management agent 524 receiving the desired state, the current state, and/or the distilled data). Using the one or more predefined policies, client management agent 524 determines a score (e.g., probability value) for each of the possible sets of one or more actions. In some examples, the score represents the likelihood that the respective set of one or more actions, when performed by client system 504, would cause the current state to converge towards the desired state (e.g., by the greatest amount). The set of one or more actions having a score that satisfies a predefined condition (e.g., the greatest score among the possible sets of one or more actions) would then be selected.

In some embodiments, the one or more predefined policies include deterministic (e.g., rule-based) and/or probabilistic policies. For instance, in some embodiments, client management agent 524 applies machine learning techniques to analyze the received distilled data in conjunction with the received current state and determine the one or more actions. The one or more predefined policies include, for example, machine learned models (e.g., supervised or unsupervised). In some embodiments, client management agent 524 applies reinforcement learning techniques that are configured to use the desired state, the current state, and the distilled data as inputs and predict (using the one or more predefined policies) the one or more actions that would mostly likely cause the current state of client system 504 to converge towards the desired state.

In some embodiments, the set of one or more actions is selected based on a difference between the current state and the previous state received from client system 504. For example, one or more previous actions were selected in accordance with one or more previous policies, where performing the one or more previous actions caused client system 504 to change from the previous state to the current state. In these examples, the one or more predefined policies are generated (e.g., updated from the one or more previous policies) based on the selected one or more previous actions and the change in the previous state to the current state with respect to the desired state. For instance, in examples where reinforcement learning techniques are used, the one or more predefined policies are generate based on a reward value, where the reward value is greater if the current state is closer than the previous state to the desired state.

The possible sets of one or more actions from which the one or more actions are determined include various configuration management actions that client system 504 is capable of performing. In some examples, the possible sets of one or more actions include the action of increasing or decreasing the resolution or granularity of monitoring for one or more parameters of the client system 504. For example, the measurement data can include data values obtained from monitoring the parameter of storage capacity for one or more client components 505A-N of client system 504. The data values can be generated at a particular resolution (e.g., the rate of monitoring or level of detail of monitoring). In this example, the possible sets of one or more actions can include the action of increasing or decreasing the resolution at which the storage capacity values are generated for the one or more client components 505A-N.

In some embodiments, the possible sets of one or more actions include the action of adding or removing one or more resources to or from client system 504 (e.g., to scale up or scale down the system). For example, the possible sets of one or more actions include the action of adding or removing one or more nodes, instances, VMs, storage components, or the like to or from client system 504. In some embodiments, the possible sets of one or more actions include the action of activating or deactivating (e.g., turning on or off) one or more components in client system 504. In some embodiments, the possible sets of one or more actions include the action of modifying the allocation of resources in client system 504. For example, one or more components in client system 504 can be reallocated for a different task, tenant, or application (e.g., changing network zones). In some embodiments, the possible sets of one or more actions include the action of modifying the type or distribution of measurement data generated by client system 504. For example, log collection can be turned on or off for one or more events of one or more components 505A-N. Accordingly, by virtue of the one or more actions being selected from the possible sets of one or more actions, it should be recognized that the one or more actions determined by client management agent 524 can include any of the actions described above.

Client management agent 524 provides one or more control commands to the client components 505A-N of client system 504. The one or more control commands correspond to the one or more actions determined by client management agent 524 based on the desired state, the current state, and the distilled data. In some embodiments, the one or more control commands are provided to client components 505A-N using the command protocols and techniques described above with reference to FIG. 4. For example, as represented by arrow 536 in FIG. 5, client management agent 524 provides the one or more control commands to resources manager 512 (e.g., in the form of one or more command requests), which forwards (e.g., as represented by arrow 540) the one or more control commands to cloud gateway 510. Cloud gateway 510 sends the one or more control commands in one or more command streams 521 to client gateway 508 via one or more unidirectional communication connections 520. In accordance with the one or more control commands, client gateway 508 causes the client system 504 to perform the one or more actions. For example, based on the one or more control commands, client gateway 508 sends one or more corresponding API calls (e.g., as represented by arrow 544) to one or more respective client components 505A-N to cause the respective client components 505A-N to perform the one or more actions. In some embodiments, upon completing the one or more actions, the respective client components 505A-N provide one or more command responses to client management agent 524 via client gateway 508, one or more bidirectional communication connections 522, cloud gateway 510, and resource management 512 (e.g., as represented by arrows 544, 542, and 538). The one or more command response can, for example, serve to inform client management agent 524 that the one or more actions were successfully completed.

In some embodiments, the process described above with reference to FIG. 5 is iterative, where client management agent 524 monitors the state of client system 504 and iteratively provides control commands to cause client system 504 to continually and progressively converge towards the desired state. For example, upon performing the one or more actions, the operating conditions of client system 504 changes. Client system 504 generates a subsequent state that reflects the updated operating conditions and provides the subsequent state to client management agent. Using the subsequent state, client management agent 524 updates the one or more policies. For example, the difference between the subsequent state and the current state relative to the desired state is used to update the one or more policies. The one or more updated policies can be used to infer future actions that are more likely to converge the state of client system 504 towards the desired state. Client system 504 also generates subsequent measurement data after performing one or more actions and provides the subsequent measurement data to highlighting agent to generate subsequent distilled data. The subsequent distilled data is provided to client management agent 524, which determines one or more subsequent actions using the one or more updated policies and based on the desired state, the subsequent state, and the subsequent distilled data.

Although in the embodiments of FIG. 5, certain components are described as being part of cloud-services computing environment 503, it should be recognized that, in other embodiments, some of the components of cloud-services computing environment 503 can operate as part of client computing environment 502. For example, the highlighting agent can be part of client computing environment 502, where the generating of distilled data from measurement data can be performed in client computing environment 502.

Figure 6:
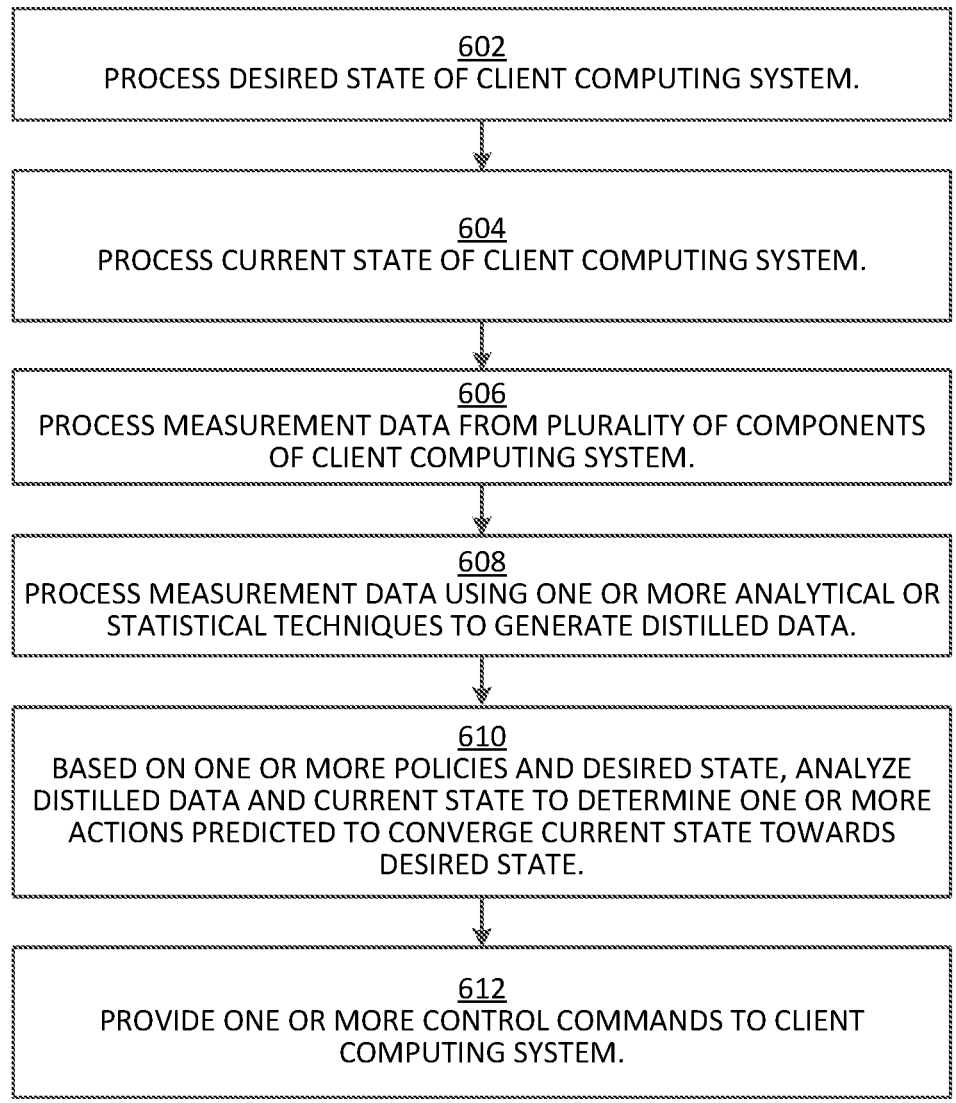
FIG. 6 illustrates a flowchart of a process for managing a client computing system using a distilled data stream, in accordance with some embodiments.

FIG. 6 illustrates a flowchart of exemplary process 600 for managing a client computing system (e.g., client system 504) using a distilled data stream, in accordance with some embodiments. In some embodiments, process 600 is performed using the systems and environments described above in FIG. 5. For example, the operations of process 600 described below are performed by one or more systems (e.g., cloud gateway 510, highlighting agent 516, client management agent 524, etc.) of a cloud-services computing environment (e.g., cloud-services computing environment 503 of FIG. 5). In some embodiments, the cloud-service computing environment is a cloud-services distributed-computing system. In process 600, some blocks are, optionally, combined, the order of some blocks is, optionally, changed, and some blocks are, optionally, omitted. In some embodiments, additional operations may be performed with any combination of operations (or sub-operations) in process 600.

At block 602, a received desired state of the client computing system is processed (e.g., received from inventory 518 and processed at client management agent 524). For example, the received desired state is buffered or pre-processed in preparation for block 610. In some embodiments, the received desired state is defined according to user input. The client computing system is, for example, a client distributed-computing system.

At block 604, a received current state of the client computing system is processed (e.g., at client management agent 524 via cloud gateway 510). For example, the received current state is buffered or pre-processed in preparation for block 610. The current state is generated by and received from the client computing system.

At block 606, measurement data from a plurality of components of the client computing system is processed (e.g., at highlighting agent 516). In particular, the measurement data is generated by and received from the plurality of components of the client computing system. For example, the measurement data is received via data streams over a period of time. The received measurement data can be buffered or pre-processed in preparation for block 608. In some embodiments, the measurement data includes performance metrics for the plurality of components of the client computing system. In some embodiments, the measurement data includes sensor data generated by sensor devices of the client computing system (e.g., client system 504).

In some examples, the measurement data is received from the client computing system via a plurality of data streams. Each data stream of the plurality of data streams is assigned to a respective component of the plurality of components of the client computing system.

In some embodiments, prior to processing the current state (block 604) and the measurement data (block 606), one or more previous control commands are provided to the client computing system. The one or more previous control commands cause the client computing system to perform the one or more previous actions and change from a previous state to the current state. In some embodiments, the measurement data is received within a predefined time period after providing the one or more previous control commands.

At block 608, the measurement data is processed (e.g., by highlighting agent 516) using one or more analytical or statistical techniques to generate distilled data. In some embodiments, the one or more analytical or statistical techniques include machine learning techniques. In some embodiments, the one or more analytical or statistical techniques are based on past observations of the client computing system made prior to receiving the current state of the client computing system (block 604) and prior to receiving the measurement data (block 606). The past observations correspond to respective past actions performed by the client computing system in response to previous commands provided by the cloud-services computing environment prior to receiving the current state of the client computing system (block 604) and prior to receiving the measurement data (block 606).

In some embodiments, processing the measurement data includes filtering the measurement data to identify a subset of the measurement data. In these embodiments, the identified subset of the measurement data is included in the distilled data (but not the unfiltered data, for example).

In some embodiments, processing the measurement data includes generating statistical data from the measurement data. In these embodiments, the distilled data includes the generated statistical data.

In some embodiments, processing the plurality of streams of measurement data using the one or more analytical or statistical techniques includes applying one or more functions to at least a portion of the measurement data to generate at least a portion of the distilled data. The one or more functions applied to the at least a portion of the measurement data include, for example, a derivative function.

At block 610, based on one or more policies and the desired state, the distilled data and the current state are analyzed (e.g., by client management agent 524) to determine one or more actions predicted to converge the current state of the client computing system towards the desired state. In some embodiments, determining the one or more actions includes determining, based on the current state and the one or more policies, a plurality of scores for a plurality of predefined actions. In these embodiments, the one or more actions are selected from the plurality of predefined actions based on the plurality of scores. In some embodiments, the one or more actions are determined further based on a difference between the current state and the previous state of the client computing system.

In some embodiments, the one or more actions include increasing or decreasing a resolution of monitoring for one or more parameters of the client computing system. It should be recognized that the one or more actions can include various other configuration actions that client computing system can performed. For instance, in some embodiments, the one or more actions include adding or removing one or more resources/instances, activating/deactivating components, or the like.

At block 612, one or more control commands are provided to the client computing system (e.g., by client management agent 524 via cloud gateway 510). The one or more control commands cause the client computing system to perform the one or more actions.

It should be appreciated that the blocks of process 600 can be iteratively performed to update the one or more policies and to progressively converge the state of the client computing system to the desired state. For example, blocks 604-612 can be iteratively performed for a received desired state. By way of example, after providing the one or more control commands to cause the client computing system to perform the one or more actions, a subsequent state of the client computing system can be received. The subsequent state is generated by the client computing system after performing the one or more actions. In some embodiments, the one or more policies is updated based on the subsequent state. For example, the one or more policies is updated based on a difference between the subsequent state and the current state relative to the desired state. The one or more updated policies can then be used in the subsequent iteration to determine one or more subsequent actions (e.g., based on the desired state, the subsequent state, and subsequent distilled data) predicted to converge the subsequent state towards the desired state.

Although the techniques associated with FIGS. 5 and 6 are described above in the context of a client computing environment and a cloud-services computing environment, it should be appreciated that the techniques can similarly be applied to any two (or more) computing environments where the operation and/or configuration of a first computing environment is managed or controlled by a second computing environment to improve the stability, efficiency, and/or performance of the first computing environment.

In accordance with some implementations, a computer-readable storage medium (e.g., a non-transitory computer readable storage medium) is provided. The computer-readable storage medium stores one or more programs for execution by one or more processors of a computing system (e.g., distributed-computing system), the one or more programs including instructions for performing any of the methods or processes described herein. The computer-readable storage medium is, for example, distributed across a plurality of memory storage devices of a plurality of computing systems in a computing environment (e.g., a cloud-services computing environment).

In accordance with some implementations, a computing system (e.g., distributed-computing system) is provided that comprises means for performing any of the methods or processes described herein.

In accordance with some implementations, a computing system (e.g., distributed-computing system) is provided that comprises one or more processors and memory storing one or more programs for execution by the one or more processors, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching. For example, it should be understood that some embodiments can include any combination of features described above with reference to FIGS. 1-6.

What is claimed is:

1. A method for managing, by a cloud-services distributed-computing system, a client distributed-computing system, the method comprising:
at the cloud-services distributed-computing system:
receiving a desired state of the client distributed-computing system, the desired state defined according to user input;
receiving a current state of the client distributed-computing system;
receiving measurement data generated by a plurality of components of the client distributed-computing system;
generating distilled data by processing the measurement data using one or more analytical or statistical techniques based on previous state changes of the client distributed-computing system resulting from control commands issued prior to receiving the current state of the client distributed-computing system;
based on one or more policies and the desired state, analyzing the distilled data and the current state to determine one or more actions predicted to converge the current state of the client distributed-computing system towards the desired state; and
providing one or more control commands to the client distributed-computing system, wherein the one or more control commands cause the client distributed-computing system to perform the one or more actions.

2. The method of claim 1, wherein processing the measurement data using the one or more analytical or statistical techniques comprises filtering the measurement data to identify a subset of the measurement data, wherein the distilled data includes the identified subset of the measurement data.

3. The method of claim 1, wherein processing the measurement data using the one or more analytical or statistical techniques comprises applying one or more functions to at least a portion of the measurement data to generate at least a portion of the distilled data.

4. The method of claim 3, wherein the one or more functions include a derivative function.

5. The method of claim 1, wherein the one or more analytical or statistical techniques include machine learning techniques.

6. The method of claim 1, wherein processing the measurement data using the one or more analytical or statistical techniques comprises generating statistical data from the measurement data, wherein the distilled data includes the generated statistical data.

7. The method of claim 1, wherein determining the one or more actions further comprises:
determining, based on the current state and the one or more policies, a plurality of scores for a plurality of predefined actions, wherein the one or more actions are selected from the plurality of predefined actions based on the plurality of scores.

8. The method of claim 1, further comprising:
receiving a subsequent state of the client distributed-computing system, the subsequent state generated by the client distributed-computing system after performing the one or more actions; and
updating the one or more policies based on a difference between the subsequent state and the current state relative to the desired state.

9. The method of claim 1, wherein the one or more actions include increasing or decreasing a resolution of monitoring for one or more parameters of the client distributed-computing system.

10. The method of claim 1, wherein the measurement data includes performance metrics for the plurality of components of the client distributed-computing system.

11. The method of claim 1, wherein the measurement data includes sensor data.

12. The method of claim 1, wherein the measurement data is received from the client distributed-computing system via a plurality of data streams, and wherein each data stream of the plurality of data streams is assigned to a respective component of the plurality of components.

13. The method of claim 1, further comprising:
prior to receiving the current state and the measurement data, providing one or more previous control commands to the client distributed-computing system, wherein the one or more previous control commands cause the client distributed-computing system to perform the one or more previous actions and to change from a previous state to the current state, and wherein the measurement data is received within a predefined time period after providing the one or more previous control commands.

14. The method of claim 13, wherein the one or more actions are determined further based on a difference between the current state and the previous state.

15. A non-transitory computer-readable storage medium storing one or more programs configured to be executed by one or more processors of a cloud-services distributed-computing system, wherein the one or more programs include instructions for:
processing a received desired state of a client distributed-computing system, the desired state defined according to user input;
processing a received current state of the client distributed-computing system, the current state generated by the client distributed-computing system;
processing received measurement data generated by a plurality of components of the client distributed-computing system;
generating distilled data by processing the measurement data using one or more analytical or statistical techniques based on previous state changes of the client distributed-computing system resulting from control commands issued prior to receiving the current state of the client distributed-computing system;
based on one or more predefined policies and the desired state, analyzing the distilled data and the current state to determine one or more actions predicted to converge the current state of the client distributed-computing system towards the desired state; and
providing one or more control commands to the client distributed-computing system, wherein the one or more control commands cause the client distributed-computing system to perform the one or more actions.

16. A cloud-services distributed-computing system, comprising:
one or more processors; and
memory storing one or more programs configured to be executed by the one or more processors, the one or more programs including instructions for:
processing a received desired state of a client distributed-computing system, the desired state defined according to user input;
processing a received current state of the client distributed-computing system, the current state generated by the client distributed-computing system;
processing received measurement data generated by a plurality of components of the client distributed-computing system;
generating distilled data by processing the measurement data using one or more analytical or statistical techniques based on previous state changes of the client distributed-computing system resulting from control commands issued prior to receiving the current state of the client distributed-computing system;
based on one or more predefined policies and the desired state, analyzing the distilled data and the current state to determine one or more actions predicted to converge the current state of the client distributed-computing system towards the desired state; and
providing one or more control commands to the client distributed-computing system, wherein the one or more control commands cause the client distributed-computing system to perform the one or more actions.

17. The cloud-services distributed-computing system of claim 16, wherein the past observations correspond to respective past actions performed by the client computing system in response to previous commands performed at the cloud-services distributed-computing system.

* * * * *